United States Patent [19]

Stoffer

[11] 3,867,699

[45] Feb. 18, 1975

[54] TRANSCEIVER SWITCHING CIRCUIT

[75] Inventor: C. Daniel Stoffer, Markham, Ontario, Canada

[73] Assignee: Rockwell International Corporation, Dallas, Tex.

[22] Filed: Dec. 14, 1973

[21] Appl. No.: 424,600

[52] U.S. Cl. .................. 325/18, 325/21

[51] Int. Cl. .................. H04b 1/44

[58] Field of Search .................. 325/5, 18–22, 325/103, 317; 328/214; 343/175, 180, 181; 179/170 HF

[56] References Cited

UNITED STATES PATENTS

| | | | |
|---|---|---|---|
| 3,219,931 | 11/1965 | Lennon III et al. | 325/18 |
| 3,328,694 | 6/1967 | Brady et al. | 325/18 |
| 3,470,472 | 9/1969 | Suzuki et al. | 325/18 |
| 3,624,506 | 11/1971 | Townsend | 325/18 |

*Primary Examiner*—Robert L. Griffin
*Assistant Examiner*—Jin F. Ng
*Attorney, Agent, or Firm*—Bruce C. Lutz

[57] ABSTRACT

A switching circuit for use in a transceiver whereby a unidirectional mixer may be used for both transmitting and receiving. The circuit allows the combination of the high gain obtainable from unidirectional active mixers with the versatility of bidirectional operation.

2 Claims, 3 Drawing Figures

TRANSCEIVER SWITCHING CIRCUIT

The present invention is generally directed toward electronic circuits and more specifically directed toward transceivers and a switching circuit therefore to allow a single unidirectional active mixer to be operated in both the transmit and receive modes of operation.

In the past, bidirectional mixers have been used in transceivers for both mixing a local oscillator frequency with a radio frequency signal to obtain an intermediate frequency signal in the receive mode and for mixing an intermediate signal with a local oscillator signal to produce the radio frequency signal in a transmit mode. However, these bidirectional mixers were passive devices with attendant conversion loss and were therefore not satisfactory for many purposes. On the other hand, high gain mixers have been of the unidirectional type and thus it has been necessary to have separate mixers for the receive and transmit functions in the prior art transceivers when using these mixers.

The present invention utilizes a switch which will route signals through the mixer in the same direction for both transmit and receive but will change the direction of signal flow through the IF and RF transformers in accordance with input signals applied to the switch.

It is, therefore, an object of the present invention to provide improved transceiver mixing apparatus.

Other objects and advantages of the present invention will be apparent from a reading of the specification and appended claims in conjunction with the drawings wherein:

Figure 1:
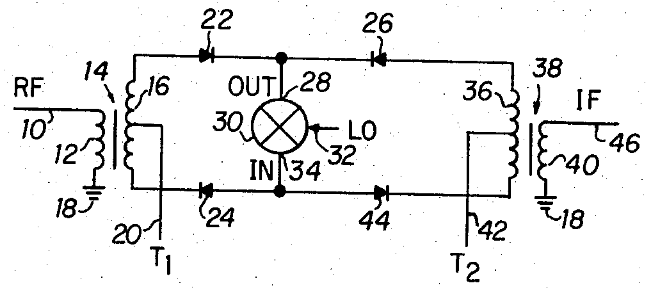
FIG. 1 is a schematic diagram of a simplified embodiment of the invention.

In FIG. 1 an input 10 feeds one winding 12 of a transformer generally designated as 14 and having a center tapped second winding 16. The other end of winding 12 is connected to ground 18 while a center tap of winding 16 is connected to a lead 20 also designated as $T_1$. One end of winding 16 is connected to an anode of a diode 22 while the other end is connected to the cathode of a diode 24. A further diode 26 has its cathode connected to the cathode of diode 22 and to a terminal 28 of a mixer 30. Mixer 30 has an amplitude modulation input or local oscillator input 32 and has another terminal 34 connected to the anode of diode 24. The anode of diode 26 is connected to one end of a center tapped winding 36 of a transformer generally designated as 38 having a second winding 40. The center tap of winding 36 connected to a terminal 42 also designated at $T_2$. A diode 44 has its anode connected to the anode of diode 24 and its cathode connected to the other end of winding 36. The winding 40 is connected between ground 18 and an output terminal 46.

Figure 2:
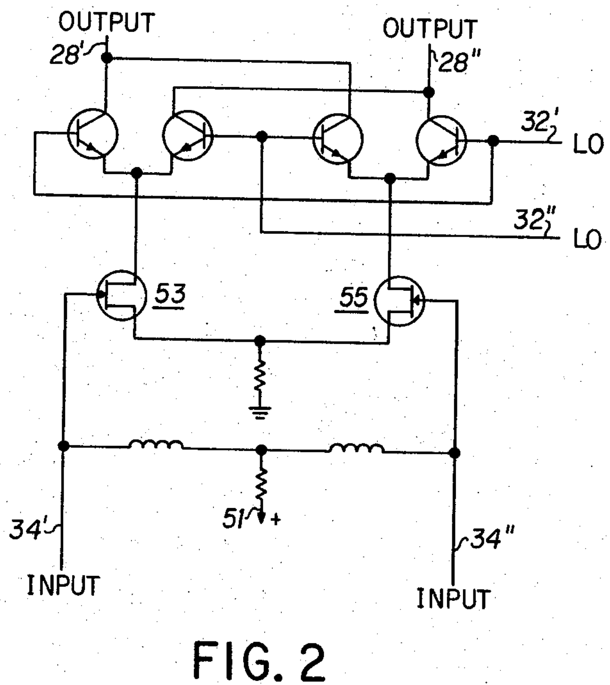
FIG. 2 is a schematic diagram of one embodiment of a unidirectional high-gain mixer.

In FIG. 2 a unidirectional mixer is illustrated which will perform the function of mixer 30 of FIG. 1. Two leads 32′ and 32″ are illustrated feeding the bases of 4 transistors used to provide a balanced amplitude modulation or mixing of the signal or signals passing therethrough. A lead 51 is utilized to supply positive bias to the circuit. This positive bias is supplied through a resistor and two coils to feed the gates of 2 FET transistors 53 and 55. The gates of these two transistors are also connected to input terminals designated as 34′ and 34″. The collectors of the previously mentioned transistors are connected to output terminals designated as 28′ and 28″. As indicated previously, the circuit of FIG. 1 is a simplified diagram showing the invention with the least possible components providing a working unit. The circuit of FIG. 2 is designed to provide a balanced configuration and reduce extraneous signals to a minimum.

Figure 3:
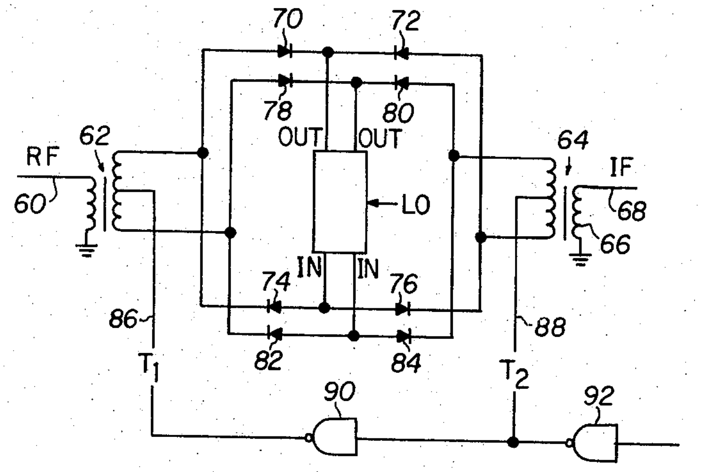
FIG. 3 is a detailed block diagram of a preferred embodiment of the present invention for utilizing a unidirectional mixer in a transceiver.

In FIG. 3 an input 60 is shown connected to a first winding of a transformer generally designated as 62 and having a center tapped secondary winding. A second transformer 64 is shown with a center tapped first winding and a second winding having one end connected to ground 66 and the other end of the second winding connected to an output terminal 68. A pair of diodes 70 and 72 are connected with their cathodes together and their anodes connected to the ends of the two center tapped windings. A second pair of diodes 74 and 76 have their anodes connected together and their cathodes connected to the anodes of diode 70 and 72, respectively. A second set of four diodes 78, 80, 82, and 84 are likewise connected to the other end leads of the center tapped windings. The center tap of the transformer windings of transformers 62 and 64 are labeled $T_1$ and $T_2$, respectively, and are also labeled as leads 86 and 88, respectively, One method of switching the circuit is to provide two inverter gates 90 and 92 whose output will range from some positive voltage such as 12 volts to ground (or zero volts) depending upon whether the input is a logic 1 or a logic 0. This type of gate may use a 12 volt input with a logic 1 condition, thus, gate 92 will respond to a logic 1 input with a logic 0 output thus providing a logic 0 on lead 88 and a logic 1 on lead 86. In the alternative, a logic 0 input gate 92 will provide 21 volts on lead 88 and 0 volts on lead 86.

OPERATION

As previously indicated, the mixer in the present invention may be a unidirectional mixer and still operate in both directions of signal flow. This is accomplished by turning on a selected path through the circuit in FIG. 1. If lead 20 is positive with respect to lead 42, there will be a current path from lead 20 through the top half of winding 16, diode 22, effectively through mixer 30, diode 44 and the lower half of winding 36 before returning to lead 42 as an output. This DC current path is larger than the amplitude of the AC or signal frequency and thus the signal frequencies do not turn off the diodes by reverse biasing them. As will be noted the path is not through diodes 24 or 26 because these are reverse biased by the direct currents involved. The mixer 30 is labeled as having an output and an input and it will be noted that current flows in the output. However, the current flowing is a direct current, while in actuality the information signal currents do flow out the lead 28. It will now be assumed that lead 42 is positive with respect to lead 20. With lead 42 positive, the current flow is through the upper half of winding 36, diode 26, the mixer 30, diode 24, and the lower half of winding 16.

In the first instance, the signals from the intermediate frequency lead 46 are applied through the lower half of transformer winding 36 to the input terminal 34 of mixer 30. These are modulated through the action of the local oscillator lead 32 to provide a radio frequency output at lead 28 and thus through the upper half of winding 16 to output terminal 10.

In the second condition of operation with lead 42 positive, an RF frequency is applied through the lower half of transformer winding 16 to the input lead 34 of mixer 30 and this RF frequency is mixed with the local oscillator frequency supplied on lead 32 to obtain the difference or intermediate frequency at the output as applied through the upper half of center tapped winding 36 to the output lead 46 via the transformer 38.

Thus, in both instances the signal of interest is applied to the input of the modulator depending upon the relative polarities of leads 20 and 42.

As will be noted, the balanced modulator and switch of FIG. 3 operates in a substantially identical fashion to that of FIG. 1, except that it has a further complete set of diode switches. This further complete set is necessary to operate the other half of the balanced mixing circuit of FIG. 2. As will be noted, there are two output leads and two input leads and thus each of these leads needs a positive source or source of direct current and a sink for direct current. Thus, with lead 86 positive with respect to 88 there will be a current flow through the upper half of the center tap winding of transformer 62, diode 70, the mixer, diode 76, and the lower half of the center tapped winding of transformer 64. Simultaneously, there will be a current path through the lower half of the winding of transformer 62, diode 78, the mixer, diode 84, and the upper half of the center tap winding of transformer 64.

As will be readily ascertained, if lead 88 is of a higher potential than lead 86, the diodes 72, 74, 80 and 82 will be switched to an ON condition to allow the current flows in the opposite direction.

As will be further ascertained, the first switched condition mentioned in connection with FIG. 3 allows the local oscillator frequency to be mixed with the intermediate frequency and provide an RF output while the second switch condition allows the RF signal to be mixed with the local oscillator to extract or detect the intermediate frequency from the RF incoming signal.

While I have described and illustrated a general circuit diagram as well as a single preferred embodiment, I wish to be limited not to the circuits described but rather to the concept as presented in the appended claims.

I claim:

1. A transceiver switch for use with a single unidirectional mixer for both transmission and reception comprising, in combination:

RF transformer means including a first winding and a center tapped second winding;

IF transformer means including a first winding and a center tapped second winding;

first logic means comprising first and second diodes connected to a first common terminal means whereby current flow through either of said diodes goes out said first common terminal;

second logic means comprising third and fourth diodes connected to a second common terminal means whereby current flow through either of said third and fourth diodes is from said second common terminal means;

means for connecting said first and second diodes respectively of said first logic means to first ends of said second windings of said RF and IF transformers, respectively;

means for connecting said third and fourth diodes respectively of said second logic means to the other ends of said second windings of said RF and IF transformers respectively;

means for connecting said first and second common terminal means to a unidirectional mixer;

means for connecting said first winding of said RF transformer to RF signal circuitry;

means for connecting said first winding of said IF transformer to IF signal circuitry; and means connected between the center taps of said second windings of said IF and RF transformers for supplying current therebetween in one direction for receiving signals and in the other direction for transmitting signals.

2. Apparatus as claimed in claim 1 comprising, in addition:

third logic means comprising fifth and sixth diodes connected to a third common terminal means whereby current flow through either of said diodes goes out said third common terminal;

fourth logic means comprising seventh and eighth diodes connected to a fourth common terminal means whereby current flow through either of said seventh and eighth diodes is from said fourth common terminal means;

means for connecting said seventh and eighth diodes respectively of said fourth logic means to the first ends of said second windings of said RF and IF transformers respectively;

means for connecting said fifth and sixth diodes respectively of said third logic means to the other ends of said second windings of said RF and IF transformers respectively; and means for connecting said third and fourth common terminal means to said unidirectional mixer.

* * * * *